US012262660B2

(12) United States Patent
Fazakas

(10) Patent No.: US 12,262,660 B2
(45) Date of Patent: Apr. 1, 2025

(54) AGRICULTURAL IMPLEMENT FOR FIELD-COLLECTION, PULVERIZATION AND FIELD-DISPERSEMENT OF FLAX OR HEMP STRAW

(71) Applicant: George Fazakas, Raymore (CA)

(72) Inventor: George Fazakas, Raymore (CA)

(*) Notice: Subject to any disclaimer, the term of this patent is extended or adjusted under 35 U.S.C. 154(b) by 437 days.

(21) Appl. No.: 17/330,100

(22) Filed: May 25, 2021

(65) Prior Publication Data

US 2022/0030770 A1 Feb. 3, 2022

(30) Foreign Application Priority Data

May 27, 2020 (CA) .................. CA 3081392

(51) Int. Cl.
| | |
|---|---|
| *A01D 82/02* | (2006.01) |
| *A01D 89/00* | (2006.01) |
| *A01F 29/04* | (2006.01) |
| *A01F 29/01* | (2006.01) |

(52) U.S. Cl.
CPC ........... *A01D 82/02* (2013.01); *A01D 89/003* (2013.01); *A01F 29/04* (2013.01); *A01F 29/01* (2013.01)

(58) Field of Classification Search
CPC ....... A01D 82/02; A01D 89/003; A01F 29/04; A01F 29/01
See application file for complete search history.

(56) References Cited

U.S. PATENT DOCUMENTS

| | | | | |
|---|---|---|---|---|
| 269,332 | A * | 12/1882 | Seiberling ............... | A01D 37/04 56/449 |
| 1,110,768 | A * | 9/1914 | George ................... | A01F 12/52 460/63 |
| 1,238,102 | A * | 8/1917 | Cahall ................... | A01D 41/142 460/109 |
| 1,765,582 | A * | 6/1930 | Hanlon .................. | A01D 41/00 56/123 |
| 1,864,772 | A * | 6/1932 | Sprague ................. | A01F 12/44 460/86 |
| 2,950,747 | A * | 8/1960 | Alloway ................. | A01F 12/40 239/650 |
| 2,974,467 | A * | 3/1961 | Long ...................... | A01F 11/00 56/364 |
| 3,007,475 | A * | 11/1961 | Long ...................... | A01D 29/00 460/73 |

(Continued)

FOREIGN PATENT DOCUMENTS

| | | | | |
|---|---|---|---|---|
| CN | 2340172 | Y * | 9/1999 | ............. A01D 82/00 |
| CN | 203618404 | U * | 6/2014 | ............. A01D 82/00 |

(Continued)

*Primary Examiner* — Arpad Fabian-Kovacs
(74) *Attorney, Agent, or Firm* — Kyle R Satterthwaite; Ryan W Dupuis; Ade & Company Inc.

(57) ABSTRACT

An agricultural implement for collecting, pulverizing and dispersing straw that has been windrowed during a harvesting operation. A frame carries a pickup mechanism at a front end thereof, and first and second straw-processing stages therebehind, and each featuring a rotor and accompanying concave having static teeth fixed thereon. The first rotor likewise has fixed teeth, and the second rotor has flailing knives, whereby the straw is gradually broken down in the two sequential stages before discharge back into the field.

20 Claims, 2 Drawing Sheets

(56) References Cited

U.S. PATENT DOCUMENTS

| | | | | |
|---|---|---|---|---|
| 3,233,394 A | * | 2/1966 | Lundell | B30B 15/0005 56/14.4 |
| 3,350,017 A | * | 10/1967 | Howell | A01F 12/40 239/650 |
| 3,521,687 A | * | 7/1970 | Gaeddert | A01F 12/40 241/97 |
| 4,136,507 A | * | 1/1979 | Hobbs | A01D 29/00 56/364 |
| 4,227,538 A | * | 10/1980 | Long | A01F 11/00 460/145 |
| 4,342,319 A | * | 8/1982 | Willis | A01F 12/40 460/112 |
| 5,205,114 A | * | 4/1993 | Hobbs | A01D 29/00 460/13 |
| 9,386,749 B1 | * | 7/2016 | Dow | A01D 84/00 |
| 10,653,069 B2 | * | 5/2020 | Farley | A01F 12/40 |
| 2009/0173051 A1 | * | 7/2009 | Aurora | A01D 34/53 56/14.7 |
| 2014/0260156 A1 | * | 9/2014 | Miller | A01D 41/16 56/16.4 R |
| 2019/0059218 A1 | * | 2/2019 | Rittershofer | A01F 12/40 |
| 2019/0313579 A1 | * | 10/2019 | Baum | A01D 43/003 |

FOREIGN PATENT DOCUMENTS

| | | | | |
|---|---|---|---|---|
| CN | 109392413 A | * | 3/2019 | A01F 15/00 |
| DE | 102007005173 A1 | * | 8/2008 | A01D 41/1243 |
| DE | 102014014871 B3 | * | 3/2016 | A01D 41/06 |
| GB | 2209112 A | * | 5/1989 | A01F 29/00 |
| RU | 2137342 C1 | * | 9/1999 | A01D 45/00 |
| RU | 2187924 C1 | * | 8/2002 | A01D 43/08 |

\* cited by examiner

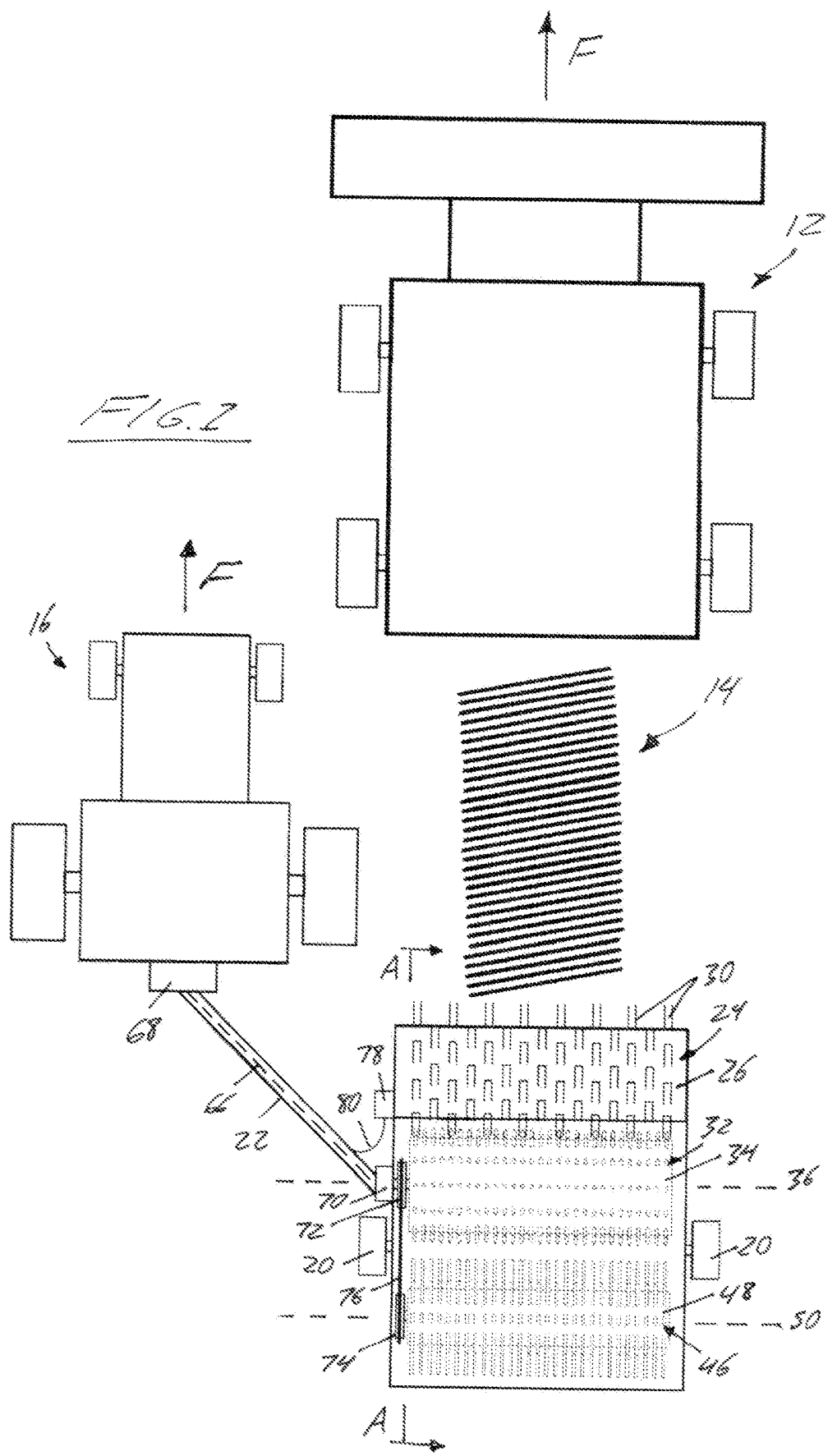

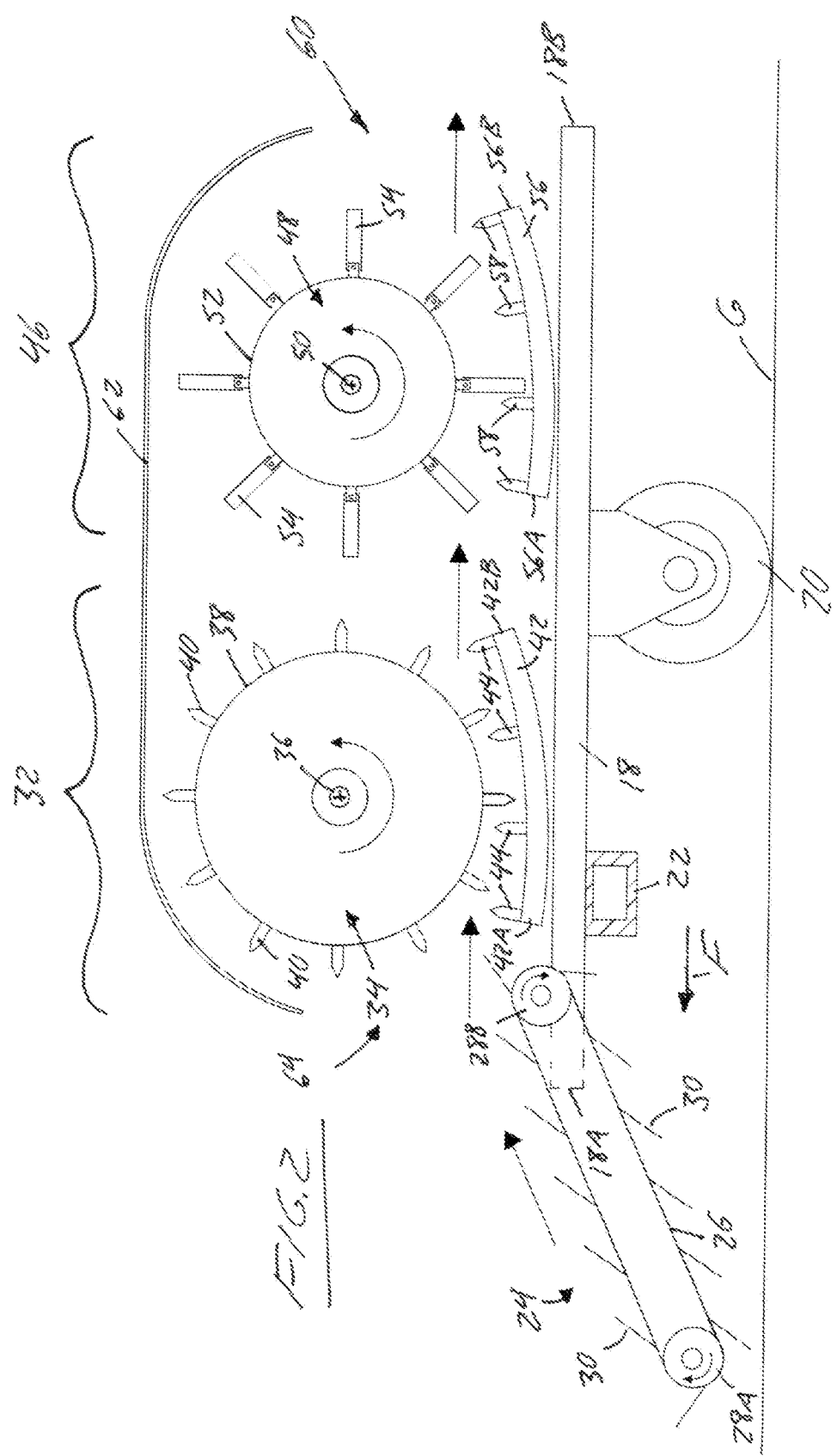

AGRICULTURAL IMPLEMENT FOR FIELD-COLLECTION, PULVERIZATION AND FIELD-DISPERSEMENT OF FLAX OR HEMP STRAW

CROSS-REFERENCE TO RELATED APPLICATIONS

This application claims foreign priority benefit under 35 U.S.C. 119(a) of Canadian Patent Application 3,081,392, filed May 27, 2020, the entirety of which is incorporated herein by reference.

FIELD OF THE INVENTION

The present invention relates generally to agriculture implements, and more particularly to agricultural implements for pulverizing output straw from a harvesting operation, and dispersing the pulverized straw back into the field.

BACKGROUND OF THE INVENTION

It is well known in the agricultural equipment industry to equip a combine harvester with an onboard straw chopper at a rear output end of the combine harvester. The straw chopper receives the processed straw from which the grain has been threshed, and chops the straw into smaller particulate that is dispersed back into the field through a rear discharge outlet of the chopper. Such choppers have conventionally been intended for use on cereal crops such as wheat and barley, and are not optimally suited for the notably different straw characteristics of flax and hemp crops. Use of a conventional straw chopper on flax and hemp straw can be particularly harsh on the chopper componentry, thus decreasing the lifespan of the equipment, or necessitating increased service frequency.

Accordingly, it would be desirable to provide an improved implement for chopping or otherwise pulverizing problematic straws, particularly those of harvested flax and hemp crops.

BRIEF DESCRIPTION OF THE DRAWINGS

One embodiment of the invention will now be described in conjunction with the accompanying drawings in which:

FIG. 1 is a schematic overhead plan view illustrating use of an inventive agricultural implement to pulverize and disperse windrowed flax or hemp straw that has been laid in the field by a separate combine harvester.

FIG. 2 is a schematic elevational cross-section of the inventive agricultural implement of FIG. 1, as viewed along line A-A thereof.

DETAILED DESCRIPTION

The drawings schematically show a towable agricultural implement 10 for collecting, pulverizing and dispersing straw that has already been windrowed in an agricultural field by a separate combine harvester 12. In a known fashion, the combine harvester 12 is responsible for the cutting of the crop from the field, the separation of the grain from the cut crop, and the discharge of the remaining straw and other residue back onto the field. This straw output is laid in a windrow 14 behind the combine harvester as it travels across the field in a forward working direction F. While FIG. 1 shows the combine harvester 12 and the implement 10 as traversing the field at the same time during a harvesting operation, with the implement 10 thus being towed in trailing relation to the combine harvester 12 by a separate tractor 16, it will be appreciated that the harvesting operation may involve use of the combine harvester alone, with the resulting windrow 14 of straw then being left in the field to dry before subsequent collection of the straw in a separate collection/pulverization operation performed later on with the inventive implement 10.

The implement 10 features a transportable frame 18 supported in elevated relation over the underlying ground surface of the field, typically by a set of rotatable ground wheels 20 for rolling movement along the ground, though tracks may alternatively be substituted for such rolling ground wheels. Either way, the frame is transportable over the ground, both during field and road travel to and from the field. The frame 18 features front and rear ends 18A, 18B that are of spaced-apart and opposing relation to one another in a longitudinal direction of the frame, which coincides with the forward working direction F in which the implement is conveyed in towed fashion during field use and road travel. The front end 18A leads the opposing rear end 18B in this forward working direction F.

A pull tongue 22 is attached to the frame 18 near the front end 18A thereof, and extends from or past the front end 18A of the frame for connection to the towing tractor 16. In the illustrated example, the pull tongue 22 and frame 18 are assembled a side-pull configuration, where the pull-tongue 22 angles laterally outward and forward from the frame so that the implement is pulled in offset relation from the tractor 16 off to one side thereof. In such instance, the tractor is driven alongside the straw windrow 14 during field use. However, the pull tongue 22 and frame 18 may alternatively be assembled a straight-pull configuration, where the pull tongue resides inline with the frame in straight-reaching fashion from the front end 18A thereof so that the implement is pulled directly behind the tractor 16 in an in-line, rather than offset, relation thereto. In such instance the tractor 16 is driven directly over the windrow 14, preferably with sufficient clearance between the wheels of the tractor to permit such travel without compaction of the windrow.

The implement 10 features a pickup mechanism 24 that is supported on the frame 18 at or proximate the front end 18A thereof, and is operably configured to pickup the windrowed straw 14 from the field. In the illustrated example, a pickup belt is employed as the pickup mechanism, and features a flexible belt 26 entrained about a set of rollers, among which there is at least included a lower front roller 28A and an upper rear roller 28B, of which the former leads the latter in the forward direction and resides at a lower elevation nearer to ground level G. The belt 26 is equipped with an array of pickup tines 30 protruding from the outside of the belt at regularly spaced intervals across the width of the belt, and along the belt's closed loop path around the rollers 28A, 28B.

At least one of the rollers 28A, 28B, and more particularly the rear upper roller 28B in the illustrated example, is rotatably driven in order to move the belt 26 in entrained fashion about the rollers 28A, 28B in a predetermined direction, under which the top half of the belt's travel path angles upwardly and rearwardly from the lower front roller 28A to the upper rear roller 28B. The pickup tines 30 are mounted to the belt exterior in positions that angle upwardly and rearwardly in the top half of the belt's travel path, and angle downwardly and forwardly in the bottom half of the belt's travel path. As the tines 30 transition around the lower front roller 28A from the bottom half of the belt's travel path to the top half thereof, the tines thus pick up the windrowed straw 14 from the field, and carry the straw upwardly and rearwardly to the upper rear roller 28B. From here, the tine-carried straw is fed from the pickup belt 26 into subsequent straw processing equipment of the implement 10 mounted to the frame behind the pickup belt 26.

In other embodiments, the pickup mechanism 24 may instead be embodied in the form of a pickup drum or reel rotating on a singular axis and having tines or fingers for picking distributed axially across the circumferentially around the drum or reel to pickup the windrowed straw and throw it rearwardly over the drum or reel. A pickup drum or reel may be less likely to feed lifted stones or rocks into the subsequent stages of the implement than the illustrated belt pickup, and thus may be more preferable, especially in markets with stone heavy soil conditions.

This straw processing equipment is divided into two discrete stages, of which a first straw-processing stage 32 resides immediately behind the pickup mechanism 24 in trailing relation thereto in the forward working direction F. This first stage 32 features a first rotor 34 rotatably supported on the frame 18 for rotation about a first horizontal rotation axis 36 that lies perpendicularly transverse to the forward working direction F. The rollers of the pickup belt, or drum or reel of a pickup drum or reel, rotate about respective axes lying in this same transverse direction. In the illustrated embodiment, the rotor 34 is composed of a drum having a cylindrical peripheral wall 38. At uniformly spaced intervals circumferentially around this peripheral wall 38 and axially across this peripheral wall 38 is a first array of teeth 40, each mounted to the peripheral wall 38 of the rotor 34 in a statically fixed position thereon protruding radially outward therefrom at a fixed angle.

The first stage 32 also features a first concave 42 that is supported on the frame 18 in a position beneath the first rotor 34, with a concave side of this first concave 42 facing inwardly toward the peripheral wall 38 of the first rotor 34 at a radially spaced distance therefrom. This first concave 42 spans a partial circumferential region of the first rotor, specifically spanning across a full or substantial fraction of the lower two quadrants of the rotor 34 in the illustrated example. The first concave 42 spans in curved fashion in a fore-aft direction from a leading end 42A of the concave 42 that is situated nearest to the front end 18A of the frame 18, to an opposing trailing end 42B of the concave 42 that is situated nearest to the rear end 18B of the frame 18.

A second array of teeth 44 are mounted to the first concave 42 at fixed positions thereon that protrude radially inward from the concave side thereof and point toward the peripheral wall 38 of the first rotor 34. The second array of teeth 44 are arrayed at uniformly spaced intervals in both directions across the first concave 42, i.e. both in the fore-aft direction in which the leading and trailing ends 42A, 42B of the concave are spaced, and in a lateral direction of the concave 142 that is parallel to the first rotation axis 36. The curvature of the first concave 42 is centered on a reference axis of parallel relation to the first rotation axis 36.

As illustrated, the first concave 42 may be positioned such that its concave side is of non-concentric relation to the peripheral wall 38 of the first rotor 34, whereby the first concave is further from the peripheral wall 38 of the first rotor at some points along the concave's curvature than at others. This may be due to a difference in relative position between the first horizontal rotation axis 36 and a central axis of the first concave's curvature, and/or a difference between the radius of curvature of the first concave's concave side and a radial distance measured from the first horizontal rotation axis 36 to the concave side of the first concave 42. In addition to such variable gap spacing between the first rotor 34 and the first concave 42 due to relative geometric sizing and centering thereof, the first concave 42 may also be adjustably mounted to the frame 18 to adjust the position and/or angle of the first concave 42 relative to the first rotor 34 to enable adjustment of this gap spacing to suit different straw types and/or straw conditions.

The pickup belt 26 is positioned such that the upper rear roller 28B thereof resides near the leading end 42A of the first concave 42A at a short distance outward from the front lower quadrant of the first rotor 34, beneath which the leading end 42A of the first concave resides. Accordingly, a region of the first processing stage 32 where the pickup belt 26 and the first concave 42 closely neighbour one another near the front lower quadrant of the first rotor 34 denotes an inlet of the first processing stage. Here, the straw carried upwardly and rearwardly along the pickup belt 26 by the tines 30 thereof is thus fed into the gap space between the first rotor 34 and the first concave 42.

The first rotor 34 is configured for driven rotation in a first predetermined direction by which the first array of teeth 40, as they move across the first rotor's two lower quadrants, travel along the concave side of the first concave 42 in the fore-aft direction toward the trailing end 42B thereof. In the axial direction of the first rotor 34 and matching lateral direction of the first concave 42, rows of teeth 40, 44 in the first and second arrays may laid out in offset relation to one another, with the tooth length of each array selected to be of sufficient length such that the rows of teeth in one array are interspersed between rows of teeth in the other array. This serves to perform an effective shearing of the straw into smaller pieces in this first processing stage 32 of the implement 10. Alternatively, even in the event of shorter teeth 40, 44 that don't accomplish such interspersed relationship, or in the event of adjustment of an adjustable concave's position to one in which the teeth aren't interspersed despite being long enough to become interspersed in another attainable position of the adjustable concave, it may nonetheless be found that sufficient breakage of the straw is still accomplished by driven movement of the straw through the stationary teeth 44 of the first concave 42 by the moving teeth 40 on the first rotor 34.

To further pulverize the straw, the implement 10 also has a second straw-processing stage 46 that trails the first straw-processing stage 32 in the forward working direction F. This second stage 46 features a second rotor 48 that is likewise rotatably supported on the frame 18 for rotation about a second horizontal rotation axis 50, which lies parallel to the first horizontal rotation axis 36. In the illustrated embodiment, the second rotor 48 is also composed of a drum having a cylindrical peripheral wall 52, though this drum may be of a smaller diameter than that of the first rotor 34. An array of knives 54 are mounted to the second rotor's peripheral wall 52 at uniformly spaced intervals circumferentially around and axially across this peripheral wall 52. Unlike the first array of teeth 40 on the first rotor 34, these knives 54 are not held at statically fixed positions pointing radially outward from the drum at fixed angles. Instead, the knives 54 are supported for swinging motion relative to the second rotor 48 about respective pivot axes lying parallel to the rotational axes 36, 50 of the two rotors. Accordingly, the knives 54 flail outwardly into radially extending positions from the second rotor 48 during driven rotation thereof at sufficient speed, but will otherwise hang statically from, or rest against, the peripheral 52 wall of the second rotor 48 (depending on their respective positions around the circumference thereof) when rotation of the second rotor is terminated. As shown, the knives 54 of the second rotor 48 may be longer than the teeth 40 of the first rotor 40.

The second stage 46 also features a second concave 56 that is supported on the frame 18 in a position beneath the second rotor 48, with a concave side of this second concave 56 facing inwardly toward the peripheral wall 52 of the second rotor 48 at a radially spaced distance therefrom. This second concave 56 spans a partial circumferential region of the second rotor 48, specifically across a full or substantial fraction of the lower two quadrants of the rotor 48 in the illustrated example. The second concave 56 spans in curved fashion from a leading end 56A of the concave 56 that is situated nearest to the front end 18A of the frame 18, to an opposing trailing end 56B of the concave 56 that is situated nearest to the rear end 18B of the frame 18. A third array of teeth 58 are mounted to the second concave 56 at fixed positions thereon that protrude radially inward from the concave side thereof, and point toward the peripheral wall 52 of the second rotor 48. The third array of teeth 58 are arrayed at uniformly spaced intervals in both directions across the second concave 56, i.e. both in the fore-aft direction between the leading and trailing ends 56A, 56B thereof, and in the lateral direction of parallel relation to the second horizontal rotation axis 50.

The curvature of the second concave 42 is centered on a reference axis of parallel relation to the second horizontal rotation axis 50. As illustrated, the second concave 56 may be positioned such that its concave side of non-concentric relation to the peripheral wall 52 of the second rotor 48, whereby the second concave is further from the peripheral wall 52 of the second rotor 48 at some points along the concave's curvature than at others. Once again, this may be due to a difference in relative position between the second horizontal rotation axis 50 and a central axis of the second concave's curvature, and/or a difference between the radius of curvature of the second concave's concave side and the radial distance from the second horizontal rotation axis 50 to the concave side of the second concave 56. In addition to such variable gap spacing between the second rotor 48 and the second concave 56 due to relative geometric sizing and centering thereof, the second concave 56 may also be adjustably mounted to the frame 18 to adjust the position and/or angle of the second concave 56 relative to the second rotor 48 to enable adjustment of this gap spacing to suit different straw types and/or straw conditions.

The leading end 56A of the second concave 56 resides below the lower front quadrant of the second rotor 48 at a short distance rearward from the trailing end 42B of the first concave 42. Accordingly, a region where the ends of the first and second concaves closely neighbour one another between the rear lower quadrant of the first rotor and the front lower quadrant of the second rotor denotes a transitional region at which the straw, already partially pulverized through the shearing or breaking action of the first processing stage 32, enters the second processing stage 46. The partially pulverized straw is swept off the trailing end 42B of the first concave 42 into the gap space between the second rotor 48 and the second concave 56 at or near the leading end 56A thereof.

The second rotor 48 is configured for driven rotation in a second predetermined direction by which the knives 54, as they move across the second rotor's two lower quadrants, travel along the concave side of the second concave 56 in the fore-aft direction toward the trailing end 56B thereof. In the axial direction of the second rotor 48 and matching lateral direction of the second concave 56, the rows of knives 54 on the second rotor 48 and the rows of teeth 58 on the second concave 56 may laid out in offset relation to one another, and with the knife and tooth length in these arrays being sufficiently long so that the rows of knives 54 of the second rotor 48 are interspersed between the rows of teeth 58 on the second concave, thus providing an effective shearing of the straw into even smaller pieces in this second processing stage 46 of the implement 10. Alternatively, even in the event of shorter knives 54 or teeth 58 that don't accomplish such interspersed relationship, or in the event of adjustment of an adjustable concave's position to one in which the knives 54 and teeth 58 aren't interspersed despite being long enough to become interspersed in another attainable position of the adjustable concave, it may nonetheless be found that sufficient breakage of the straw is still accomplished by driven movement of the straw through the stationary teeth 58 of the second concave 56 by the moving knives 40 of the second rotor 48.

The straw, now fully pulverized to a fine particulate by the two separate processing stages 32, 46, is swept off the trailing end 56B of the second concave 56 through a rear discharge opening 60 of the implement, and back into the field, thus dispersing the finely pulverized straw back onto the ground G.

The illustrate embodiment has the second concave 56 positioned beneath the second rotor 48, thus matching the under-rotor configuration of the first concave 42, and so the first and second rotational directions in which the two rotors are driven are one in the same. In this embodiment, the partially pulverized straw from the first processing stage 32 thus passes beneath the second rotor 48 of the second processing stage 46. In an alternative embodiment, if the first concave 42 is enlarged or shifted in position to raise its trailing end 42B up to a higher elevation, the partially pulverized straw from the second section may alternatively be directed upwardly through the transition region toward the front upper quadrant of the second rotor, in which case the second concave may instead be mounted above the two upper quadrants of the second rotor. In such instance, the overhead second concave may be mounted on, or integrated into, an upper housing 62 that is schematically shown in FIG. 2 to span over the two rotors 34, 48 from an inlet opening 64 situated in front of the first stage 32 above the pickup belt 26, to the discharge opening 60 situated behind the second stage 46 at the rear end of the implement. In the case of such an overhead configuration of the second concave 56, the second rotor would instead be driven in counter-rotating relation to the first rotor.

Referring back to FIG. 1, a mechanical drivetrain 66 (illustrated only schematically by a dashed line) is installed on the pull tongue 22 and spans therealong to connect at an input end of said drivetrain 22 to a power take-off (PTO) 68 of the towing tractor 16. An opposing output end of said mechanical drivetrain 66 connects to the input of a gearbox 70 supported on the implement frame 18 beside the first rotor 34. An output of this gearbox 68 is coupled to a first support shaft that supports the first rotor 34 and defines the first horizontal rotation axis 36 on which the first rotor is rotatable. A first pulley 72 is mounted on the first support shaft, and is positioned in alignment with a second pulley 74 that is likewise mounted on a second support shaft that supports the second rotor 48 and defines the second horizontal rotation axis 50 on which the second rotor 48 is rotatable. A transmission belt 76 is entrained around the first and second pulleys 72, 74, whereby operation of the tractor PTO 68 will drive rotation of the first rotor 34 via the drivetrain 66 and gearbox 68, which in turn drives rotation of the second rotor 48 via the transmission belt 76. The pickup belt 26 is separately driven by a hydraulic motor 78, whose output is coupled to one of the rollers 28A, 28B for driven rotation thereof. The hydraulic motor 78 is supplied via a hydraulic line 80 that is routed along the pull tongue 22 from the hydraulic motor for connection to a hydraulic power system of the tractor 16.

It will be appreciated that the forgoing is just one example of a suitable drive system by which the pickup mechanism 24 and first and second rotors 34, 48 may be operated, and that other drive system variants within the purview of those skilled in the art may alternatively be employed, without detriment to inventive aspects of the novel multi-stage implement design. Through use of multiple straw-processing stages, such as the illustrated example of a first preliminary stage using a fixed-tooth rotor and a second subsequent stage using a flailing-knife rotor, more optimal balance is believed to be achievable between the functional goal of achieving substantial breakdown of the straw into a fine particulate suitable for dispersion back into the soil, and the practical goal of achieving a longer wear life for the working components of the implement.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An agricultural implement for collecting, pulverizing and dispersing straw that has been windrowed during a harvesting operation, said implement comprising:
    a frame configured for conveyance thereof in a forward working direction over an area of farmland on which said straw has been windrowed, said frame having opposing front and rear ends, of which said front end leads said rear end in the forward working direction;
    a pickup mechanism supported on the frame at or proximate the front end thereof, and operably configured to pickup said straw from said farmland;
    a first straw-processing stage residing in trailing relation to the pickup mechanism to receive said straw therefrom, said first straw-processing stage comprising:
        a first rotor supported for rotation about a first rotation axis lying transversely to said forward working direction;
        a first array of teeth mounted to the rotor in fixed positions thereon protruding outward therefrom, said first array of teeth being arrayed circumferentially around and axially along said first rotor;
        a first concave supported in a position in which a concave side of said first concave faces inwardly toward the outer periphery of the first rotor in radially spaced relation therefrom, said concave side spanning a partial circumferential region of said first rotor in curved fashion from a leading end of the first concave nearest the front end of the frame to a trailing end of the first concave nearest the rear end of the frame; and
        a second array of teeth mounted to the first concave in fixed positions thereon protruding inwardly from the concave side thereof toward the first rotor, said second array of teeth being arrayed in two dimensions across said first concave, wherein the first rotor is configured for driven rotation in a first predetermined direction operable to move said first array of teeth along the concave side of the first concave toward the trailing end thereof as said first array of teeth move through said partial circumferential region of the first rotor; and
    a second straw-processing stage residing in trailing relation to the first straw-processing stage to receive said straw therefrom, said second straw-processing stage comprising:
        a second rotor supported for rotation about a second rotation axis lying transversely to said forward working direction;
        an array of knives supported on said second rotor in positions arrayed circumferentially around and axially along said second rotor, said array of knives being supported on said second rotor for swinging movement of said knives relative thereto, whereby said knives flail outward from said second rotor during driven rotation thereof, and wherein the second rotor is configured for driven rotation in a second predetermined direction operable to move said knives rearwardly from a transition region from which straw is received from said first straw-processing stage.

2. The implement of claim 1 wherein the second straw-processing stage further comprises a second concave supported in a position in which a concave side of said second concave faces inwardly toward the outer periphery of the second rotor in radially spaced relation therefrom, said concave side of the second concave spanning a partial circumferential region of said second rotor in curved fashion from a leading end of the second concave nearest the front end of the frame to a trailing end of the second concave nearest the rear end of the frame.

3. The implement of claim 2 wherein the second straw-processing stage further comprises a third array of teeth mounted to the second concave in fixed positions thereon protruding inwardly from the concave side thereof toward the second rotor, said third array of teeth being arrayed in two dimensions across said second concave, wherein the second predetermined direction in which the second rotor is rotationally driven is operable to move said knives along the concave side of the second concave toward the trailing end thereof as said knives move through said partial circumferential region of the second rotor.

4. The implement of claim 2 wherein said second concave resides beneath the second rotor.

5. The implement of claim 1 wherein the first concave resides beneath the first rotor.

6. The implement of claim 1 wherein the first predetermined direction in which the first rotor is rotationally driven is a rotational direction in which the first rotor spins rearwardly at lower quadrants thereof.

7. The implement of claim 6 wherein the first concave resides beneath said first rotor.

8. The implement of claim 6 wherein the second predetermined direction in which the second rotor is rotationally driven matches the rotational direction of the first rotor, and the second rotor likewise spins rearwardly at lower quadrants thereof.

9. The implement of claim 7 wherein the second predetermined direction in which the second rotor is rotationally driven matches the rotational direction of the first rotor, and the second rotor likewise spins rearwardly at lower quadrants thereof.

10. The implement of claim 1 wherein the second predetermined direction in which the second rotor is rotationally driven is a rotational direction in which the second rotors spins rearwardly at lower quadrants thereof.

11. The implement of claim 2 wherein the second predetermined direction in which the second rotor is rotationally driven is a rotational direction in which the second rotors spins rearwardly at lower quadrants thereof.

12. The implement of claim 3 wherein the second predetermined direction in which the second rotor is rotationally driven is a rotational direction in which the second rotors spins rearwardly at lower quadrants thereof.

13. The implement of claim 11 wherein in the second concave resides beneath the second rotor.

14. The implement of claim 12 wherein in the second concave resides beneath the second rotor.

15. The implement of claim 11 wherein the first predetermined direction in which the first rotor is rotationally driven matches the rotational direction of the second rotor, and the first rotor likewise spins rearwardly at lower quadrants thereof.

16. The implement of claim 12 wherein the first predetermined direction in which the first rotor is rotationally driven matches the rotational direction of the second rotor, and the first rotor likewise spins rearwardly at lower quadrants thereof.

17. The implement of claim 13 wherein the first predetermined direction in which the first rotor is rotationally driven matches the rotational direction of the second rotor, and the first rotor likewise spins rearwardly at lower quadrants thereof.

18. The implement of claim 14 wherein the first predetermined direction in which the first rotor is rotationally driven matches the rotational direction of the second rotor, and the first rotor likewise spins rearwardly at lower quadrants thereof.

19. The implement of claim 17 wherein the first concave resides beneath the first rotor.

20. The implement of claim 18 wherein the first concave resides beneath the first rotor.

\* \* \* \* \*